UNITED STATES PATENT OFFICE.

ADOLF SAVELSBERG, OF AACHEN, GERMANY.

METHOD OF ROASTING SULFUROUS ORES.

No. 870,690.    Specification of Letters Patent.    Patented Nov. 12, 1907.

Application filed September 17, 1906. Serial No. 335,018.

*To all whom it may concern:*

Be it known that I, ADOLF SAVELSBERG, a subject of the German Emperor, and a resident of Aachen, 131 Kaiser-Allee, have invented a new and Improved Method of Roasting Sulfurous Ores, of which the following is a full, clear, and exact description.

The present invention relates to a method of roasting sulfurous ores and consists in the ores being in the first place partly desulfurized by roasting the same in a converter, and destroying the structure resulting from the sintering thus arising, which is detrimental to the final roasting process, by treatment with water, after which this mass or this mass mixed with more sulfurous ore in its crude state is blown through again in the converter.

The desulfurization of sulfurous ores has been carried out in such a way that the roasting process was divided into a preliminary roasting and a final roasting, and both these processes took place in separated apparatus, the first in reverberatory furnaces with the employment of combustible material, the second in the converter. The air had to gain access to all the particles of ore in the first roasting process and a premature sintering of the ores had to be prevented. In order to attain this the ores were kept continuously in motion in the reverberatory furnace by means of suitable stirring, whereby on the one hand the grains of ore were prevented mechanically from being baked together or were broken up, and on the other hand a constant mixing of the grains of ore was obtained, so that the oxidizing air passing over the latter came gradually into contact with all the particles of ore. It would be of advantage even in the first roasting process to supply the oxidizing air to the ore by blowing it through the ore, instead of letting it act only on the upper surface of the charge as in the first roasting in the reverberatory furnace. The trouble and expense of stirring the mass would be thus obviated, and expensive complicated furnaces would be made superfluous, and also the first roasting process could take place in an exceedingly simple apparatus, *i. e.* in the converter, and almost without the expense of combustible material. It has, however, been found, that it is not possible for the firstroasting to take place in the converter in such a way that the ores remain powdery during this stage of the roasting process, as is attained in the working of the reverberatory furnace by continuously stirring the ore; on the contrary sintering of the ore takes place very soon. But it has proved desirable for some kinds of ore to divide the previous process for the roasting of sulfurous ores in the converter into two parts namely, into a first and into a final roasting, since such ores if roasted in one operation retain too much sulfur.

Now an important object of the present invention is to make possible the division of the roasting process into two parts also with roasting in the converter by means of blowing, in spite of the sintering taking place in the first roasting, and thereby making complicated roasting apparatus superfluous and also reducing the combustible material for the first roasting to zero. This is attained by carrying out the process in such a manner that during the first or preliminary roasting in the converter only a superficial sintering takes place, and thereafter the sintering of the charge, which is deleterious or harmful to the succeeding roasting, is destroyed by thoroughly moistening the sintered mass with water or other suitable liquids.

The method in accordance with the present invention is preferably executed as follows:—The ores are mixed with a material which possesses the property of swelling when it absorbs water, or gets it by heating, and thereby acts as a disintegrating agent, that is to say, relaxes the cohesion of the masses surrounding it. As such an addition limestone, for example, is suitable. In mixing sulfurous ores with limestone or the like the proportion of the alkalies to the acids may be regulated in such a way that complete scorification of the mixture thus prepared does not take place during the blowing, but only a superficial sintering and also only a partial desulfurization of the ore. The added limestone is contained in the sintered mass partly in the form of burnt lime, CaO, and partly as sulfate of lime, $CaSO_4$, and partly but least of all, as silicate. The mixture blown through in the above mentioned manner, which has a superficial sintered mass possessing the shape of the converter, still contains too much sulfur for the subsequent shaft-furnace process and must therefore be desulfurized in a second blowing process. But in this case it is necessary to pulverize the material to be calcined. Mechanical pulverization by means of a hammer and wedge, or stone breakers, or other mechanical auxiliary means has proved impracticable in practice and uneconomical. If, however, the sintered mass has water poured over it, the burnt lime contained in it exercises an explosive effect on the body when the water is soaked up, so that the sintered mass is shattered and can be brought with ease into the state suitable for a second blowing process. The above described action of the lime is assisted by sulfates which have formed during the blowing process of the ore.

In the case of ores which have the property of decomposing with subsequent damping with water in consequence of their own composition, a special substance which after being heated swells up in contact with water of the above described kind are of course not necessary. It has however been found, that the ores prepared in the above described manner can be blown to an excellent roasting material either by themselves alone, or mixed with other crude sulfurous ore. In both cases, under certain circumstances, an addition of limestone or the like may be omitted. Also the blasting or blowing process may be varied according to the character in each case, so that only part of the whole of the special swelling substance required is added in the first blowing, and then the remaining material is added at the final blowing in which case this remaining material subsequently added acts chemically on the ore mass, e. g. as a slag forming material; or when blowing without special swelling substances, namely when the ores contain sufficient suitable foreign constituents, so that the structure of the sintered mass which forms can be destroyed again by means of water, and only adding limestone or the like at the second blowing.

It may be pointed out that the limestone, as well as the ore at the first blowing, may be employed in fairly coarse form in this method of roasting, whereby, firstly, the costs of grinding are saved, and, secondly, the reactions in the first blowing take place less intensively which is very desirable; the pulverization of the limestone and of the ore necessary for the second blowing process (final roasting) then takes place in a very suitable and advantageous manner by treating with water the body first obtained in the roasting process. The first blowing accomplishes only a partial desulfurization, the product being readily disintegrated with water. It is however, not practicable to roast to a finish by a single blowing in the converter in one operation, for the reason that the product which would become a hard sintered mass would contain too much unroasted sulfid ore and undecomposed sulfites inclosed within the roasted mass. Consequently I disintegrate after the first roasting and then roast again.

What I claim as my invention and desire to secure by Letters Patent is:—

1. A method of roasting sulfurous ores consisting in roasting the crude ore in a converter in the presence of a substance which after being heated swells up in contact with water, and thereby partially desulfurizing the same, adding water to the mass thus obtained and thereby destroying the structure resulting from the sintering of the same, and roasting the mass again under the action of a blast in a converter.

2. A method of roasting sulfurous ores consisting in roasting the crude ore in a converter in the presence of a substance which after being heated swells up in contact with water, and thereby partially desulfurizing the same, adding water to the mass thus obtained and thereby destroying the structure resulting from the sintering of the same, adding crude ore to said mass, and roasting the mixture under the action of a blast in a converter.

3. A method of roasting sulfurous ores consisting in mixing the crude ore with a substance which after being heated swells up in contact with water, roasting said mixture in a converter and thereby partially desulfurizing the same, adding water to the mass thus obtained and thereby destroying the structure resulting from the sintering of the same, and roasting the mass again under the action of a blast converter.

4. A method of roasting sulfurous ores consisting in mixing the crude ore with limestone, roasting said mixture in a converter and thereby partially desulfurizing the same, adding water to the mass thus obtained and thereby destroying the structure resulting from the sintering of the same, and roasting the mass again under the action of a blast in a converter.

5. A method, which comprises roasting sulfurous ores in a converter in the presence of a substance which after being heated disintegrates in water, dumping the charge, wetting the same, and charging the wet disintegrated mass into a converter and roasting the same under the action of the blast.

6. A method of roasting sulfurous ores consisting in mixing the crude ore with limestone, roasting said mixture in a converter and thereby partially desulfurizing the same, adding water to the mass thus obtained and thereby destroying the structure resulting from the sintering of the same, disintegrating the same, mixing limestone with said disintegrated mass, and roasting the latter mixture again under the action of a blast in a converter.

In witness whereof, I have signed my name in the presence of two subscribing witnesses.

ADOLF SAVELSBERG.

Witnesses:
HENRY QUADFLIEG,
JOHN NYSSEN.